United States Patent Office 3,490,271
Patented Jan. 20, 1970

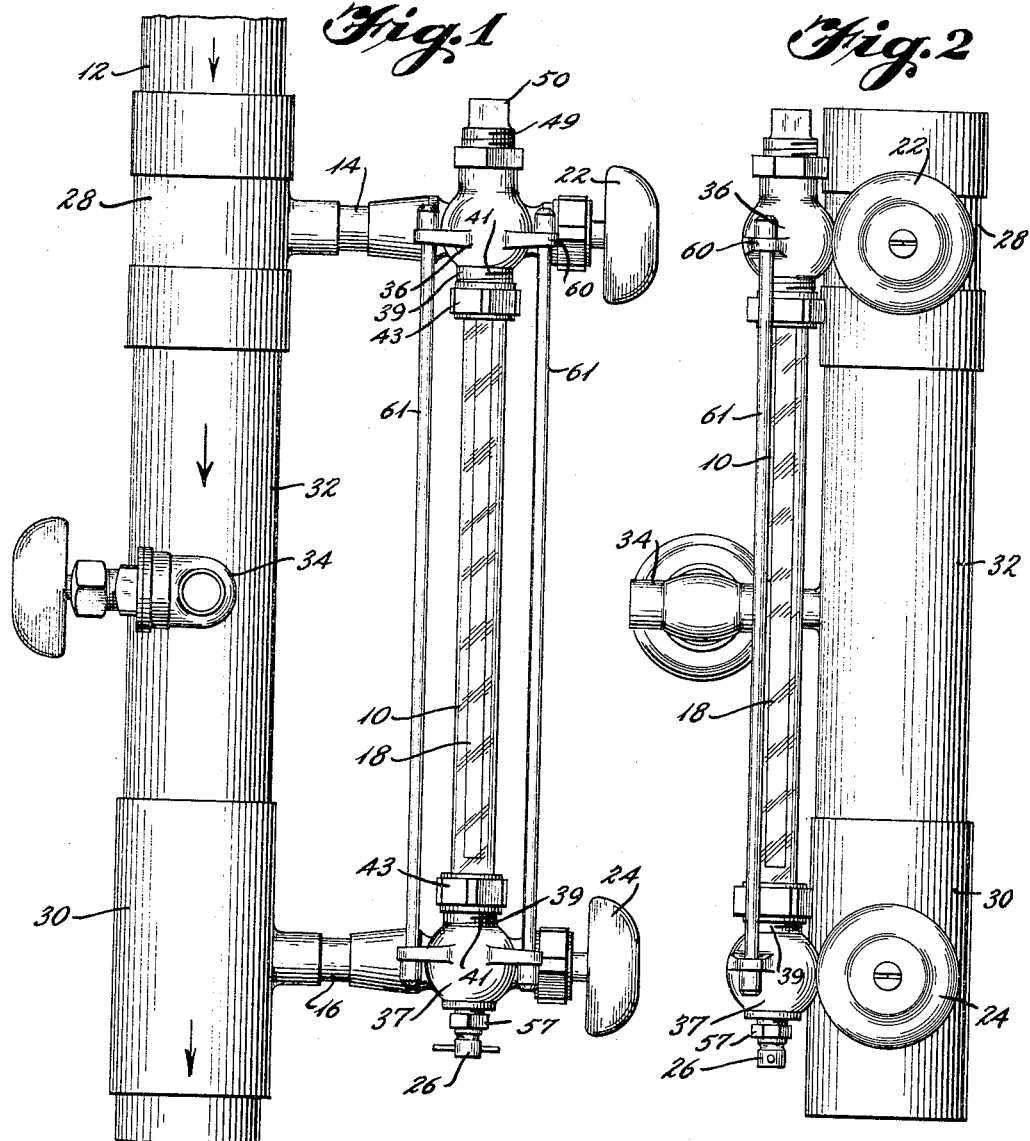
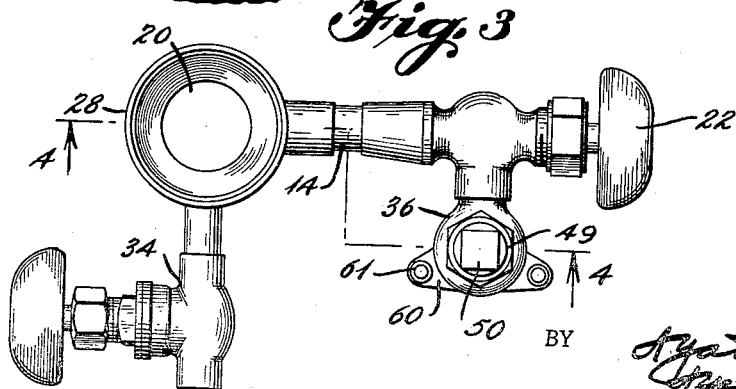

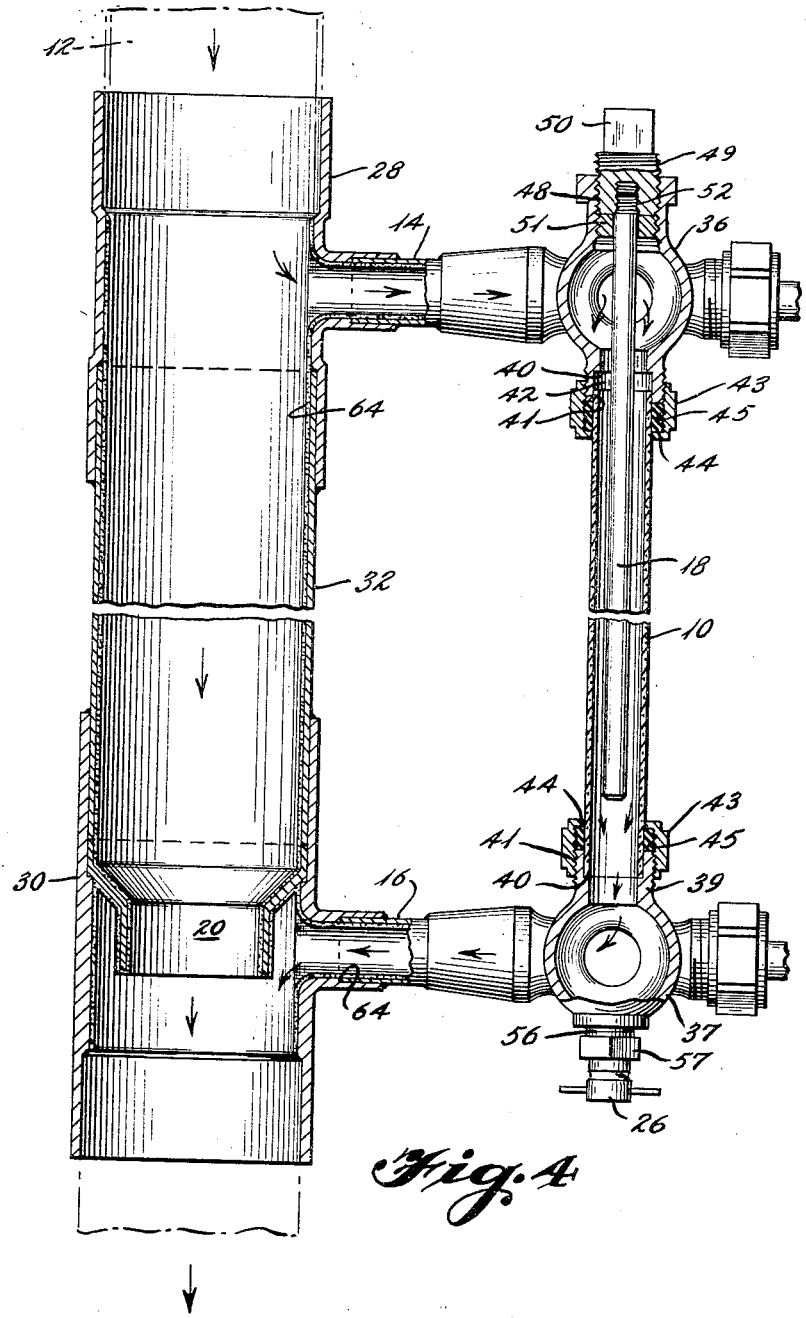

3,490,271
VISUAL CORROSION INDICATOR
Thomas D. Hays, 2991 Woodhaven Road,
Macon, Ga. 31204
Filed May 11, 1967, Ser. No. 637,734
Int. Cl. G01n 17/00
U.S. Cl. 73—86                              7 Claims

ABSTRACT OF THE DISCLOSURE

A device for visually indicating the extent of corrosion within a piping system or the like includes a transparent sight glass having mounted theren a rod of the same material as the inner surface of the piping system so that the extent of corrosion within the piping system can be readily estimated, and which is also arranged for easy removal for detail examination and testing of the extent of the corrosion.

The method of estimating corrosion extent by visual inspection of a corrodible rod visible through a sight glass, and the new use of corrodible members within transparent sight glasses to visually indicate the extent of corrosion are also claimed.

This invention relates to corrosion control and more particularly to a method and a device in which the extent of corrosion within a system may be estimated by visual inspection of a corrodible member subject to the corroding action of fluid within the system and arranged behind a transparent member so as to be seen from outside the system. Prior art devices and methods for indicating corrosion in a system are relatively complex. In some devices, such as that disclosed in Patent No. 1,769,463 to Rice, a member is arranged so that it may be removed from a closed system for testing the extent of corrosion by chemical or physical tests. In Patent No. 3,004,232 to Schaschl, changes in the electrical characteristics of a body caused by corrosion are measured to indicate the extent of corrosion within the system.

Such devices are suitable for large industrial or military facilities where their expense is justified, or qualified personnel are available to conduct the testing, and where systematic routines can be enforced to insure regular testing. Such devices are not suitable for use within smaller organizations, or with less expensive apparatus. Personnel with the ability, skill and equipment to test the sample probes may not be available. Even if available, personnel may neglect periodic testing required, particularly where it takes several years for disabling corrosion to occur, or where substantial labor is required to remove and test the corrodible sample.

Corrosion control is important even with relatively inexpensive installations. Heat transfer efficiency may be adversely affected in air conditioning, refrigeration, heating systems, or in condensers. Scale buildup may reduce fluid carrying capacity of a piping system. Scale may break loose and cause damage in other parts of the system. Parts might fail and cause extensive damage to other parts.

Apparently, many persons have chosen to accept these risks because the expense of prior art corrosion testing methods and devices was not justified. In such cases, breakdowns often occurred when an old system was operated at its highest capacity due to a pressing need. For example, many heating systems fail on the coldest day of winter. There has long been a need for an inexpensive device with which the extent of corrosion within a system can be estimated without undue effort to indicate the need for more sophisticated testing or corrective action.

Among the objects of the present invention is the provision of a device in which the extent of corrosion within a piping system or the like can be readily seen and watched over a long period of time without any particular effort. A further object is the provision of a device which readily lends itself to more sophisticated testing by providing a readily removable sample probe and means for withdrawing fluid for testing. A still further object is the provision of a device in which a portion of the piping fluid is diverted through the system. A still further object is the provision of a device in which fluid flow can be readily controlled or cut off and which is protected from inadvertent breakage. A still further object is the provision of a device which is inexpensive in construction and operation.

Other objects and advantages of the invention will be apparent from the following description considered in conjunction with the accompanying drawings in which:

FIG. 1 is a front view of the visual corrosion indicator of the present invention;

FIG. 2, a side view;

FIG. 3, a top view;

FIG. 4, a section on the line 4—4 of FIG. 3, some of the parts being broken away; and FIG. 5, a side view of the corrosion test rod of the present invention.

Briefly stated, these and other objects of the invention are accomplished by providing as illustrated in FIG. 1 a sight glass 10 mounted at one side of a flow pipe 12 and connected thereto by entrance pipe 14 and exit pipe 16. A rod 18 made of the same material as flow pipe 12 is mounted within the sight glass. A narrow throat 20 diverts fluid through the sight glass. Valves 22 and 24 control flow through the entrance and exit pipes, respectively. A petcock 26 permits withdrawal of fluid from the sight glass.

Referring to FIGS. 1 and 4, entrance and exit pipes 14 and 16 are connected to flow pipe 12 by couplings 28 and 30, respectively. A central tube 32 connects couplings 28 and 30. The lower end of tube 32 is constricted to form a narrow throat 20. A faucet 34 is fixed to the side of central tube 32.

As illustrated in FIGS. 2 and 3, the sight glass is offset from entrance and exit pipes 14 and 16. The outlets of valves 22 and 24 are connected to spherical couplings 36, 37. The lower end of upper coupling 36 and the upper end of lower coupling 37 have cylindrical projections 39 thereon. The sight glass 10, which is cylindrical in shape, fits therein and abuts against an internal shoulder 40 within cylindrical projections 39 at its lower end. The sight glass 10 is of less length than the distance between the shoulders 40 of the couplings 36, 37. The gap 42 within upper coupling 36 permits insertion and removal of the sight glass.

The exterior of projection 39 has threads 41 cut therein for receiving a nut 43 with an internally projecting flange 44 for holding a resilient packing washer 45.

As also illustrated in FIG. 4, the upper end of spherical coupling 36 has a tubular projection 48 thereon which is internally threaded to receive a threaded plug 49 having a square end 50 for engagement by a wrench. A packing plug 51 is threaded into projection 48 immediately below plug 49.

The corrodible rod 18 has its upper end 52 threaded to fit within a threaded hole in the lower end of plug 49. Rod 18 is normally made of the same metal as the interior surface of pipe 12. A steel rod is used with steel pipes, a copper rod with copper pipes, etc. Alternatively, a material having different corrosion characteristics than the pipe interior might be used to magnify or minimize.

The lower end of spherical coupling 37 is internally threaded to receive a tubular connection 56. A hexagonal head 57 is formed on the outer side of the lower end of section 56 for engagement by a wrench. The interior of the connection is threaded to receive petcock 26.

Wings 60 are formed on the sides of spherical couplings 36, 37 for receiving tie rods 61.

All interior parts of the connections, couplings, etc., are optionally covered with a Teflon or other plastic layer 64 to insure smooth flow and eliminate corrosion from the interior of the indicator itself.

In use, a portion of the fluid flowing in pipes 12 is diverted through the sight glass by action of throat 20 and under the control of valves 22, 24. Fluid flows over the rod 18 which desirably will be made of the same metal as the interior surface of the pipes 12. An iron rod is used with iron pipes, a copper rod with copper pipes, etc. If desired, the rod can be made of some other metal which corrodes at a faster rate so as to magnify the indication of corrosion within the pipes 12 in uses where even slight corrosion is undesirable. It might also be made of a metal which corrodes at a slower rate in uses where only extreme corrosion is a problem.

If desired, the rod 18 can be removed for closer examination or testing by unscrewing plug 49. In such a case, flow through the sight glass should first be stopped by valves 22 and 24.

Pipe fluid can be withdrawn slowly through petcock 26, or more quickly through faucet 34. This is helpful in conducting chemical tests for corrosion control.

The possibility of accidental breakage of sight glass 10 is minimized by tie rods 61.

It will be readily apparent that a visual corrosion indicator has been provided in which the extent of corrosion can be readily seen and observed so that it can be determined when more sophisticated testing or corrective action is necessary. It will also be apparent that the device lends itself to closer examination and corrosion testing, that the flow of fluid through the corrosion indicator can be readily controlled, that the device is inexpensive in construction and use, and the possibility of inadvertent breakage is reduced.

It will be obvious to one skilled in the art that various changes may be made in the invention without departing from the spirit and scope thereof, and, therefore, the invention is not limited by that which is illustrated in the drawings and described in the specification.

What is claimed is:

1. A visual corrosion indicator apparatus for indicating the amount of corrosion within a fluid system having pipes with internal surfaces of a selected material comprising an elongated tubular member for insertion along the path of fluid flow of said system, inlet and outlet pipe means connected to said tubular member adjacent to opposite ends thereof, an elongated transparent sight glass extending between said inlet and outlet pipe means and in communication therewith, said elongated tubular member having a constricted throat located between said inlet and outlet pipe means to cause fluid to flow through said sight glass in the same direction as the flow of fluid in said system, an elongated indicator means mounted on one of said pipe means adjacent to one end of said transparent sight glass and extending through said glass and for substantially the entire length thereof, said indicator means having a surface visible through said sight glass, said surface of the indicator means being of a material similar to the material of the interior of said fluid system pipes, whereby fluid from the system flows through said transparent sight glass where it contacts the surface of said indicator means so that the amount of corrosion on said surface will be indicative of the amount of corrosion within the fluid system pipes.

2. The structure of claim 1 in which said elongated indicator means not only is visible at all times but is removable from said sight glass for closer inspection and testing after which said indicator means is returned to said sight glass.

3. The structure of claim 1 including control valve means on each of said inlet and outlet pipe means.

4. The structure of claim 1 including drain valve means for removing fluid samples from said fluid system.

5. The structure of claim 1 in which said surface of the indicator means is the same material as the material of the interior of said fluid system.

6. The structure of claim 1 in which said surface of the indicator means is of more highly corrosive material than the material of the interior of said fluid system.

7. The structure of claim 1 in which said surface of the indicator means is of less highly corrosive material than the material of the interior of said fluid system.

References Cited

UNITED STATES PATENTS

| | | | |
|---|---|---|---|
| 479,235 | 7/1892 | Woods | 73—326 |
| 1,485,250 | 2/1924 | Crose | 73—323 |
| 2,484,279 | 10/1949 | Folz | 73—86 |
| 2,976,123 | 3/1961 | Marsh et al. | 73—86 |
| 3,199,488 | 8/1965 | Farr | 116—114 |

CHARLES A. RUEHL, Primary Examiner